United States Patent
Kobayashi

(10) Patent No.: US 11,473,843 B2
(45) Date of Patent: Oct. 18, 2022

(54) THERMOCHEMICAL REGENERATION WITH OXIDANT PREHEATING

(71) Applicant: Hisashi Kobayashi, Bedford, NY (US)

(72) Inventor: Hisashi Kobayashi, Bedford, NY (US)

(73) Assignee: Praxair Technology, Inc., Danbury, CT (US)

( * ) Notice: Subject to any disclaimer, the term of this patent is extended or adjusted under 35 U.S.C. 154(b) by 499 days.

(21) Appl. No.: 16/561,175

(22) Filed: Sep. 5, 2019

(65) Prior Publication Data
US 2019/0390909 A1  Dec. 26, 2019

Related U.S. Application Data

(62) Division of application No. 15/235,689, filed on Aug. 12, 2016, now Pat. No. 10,458,712.

(60) Provisional application No. 62/211,510, filed on Aug. 28, 2015.

(51) Int. Cl.
*F27D 17/00* (2006.01)
*C01B 3/36* (2006.01)
*C01B 3/34* (2006.01)

(52) U.S. Cl.
CPC .............. *F27D 17/004* (2013.01); *C01B 3/34* (2013.01); *C01B 3/36* (2013.01); *F27D 2017/007* (2013.01)

(58) Field of Classification Search
CPC .. C01B 3/36; C01B 3/34; C03B 5/235; C03B 5/237; F27D 17/004; F27D 2017/007; Y02P 40/50; Y02P 20/10
See application file for complete search history.

(56) References Cited

U.S. PATENT DOCUMENTS

| | | | |
|---|---|---|---|
| 4,347,072 A * | 8/1982 | Nagaoka | C03B 5/235 65/347 |
| 5,453,259 A * | 9/1995 | D'Souza | F23G 7/068 423/245.3 |
| 5,714,132 A * | 2/1998 | Kapoor | F25J 3/0223 423/655 |
| 6,113,874 A | 9/2000 | Kobayashi | |
| 6,210,157 B1 | 4/2001 | Kobayashi | |
| 6,223,519 B1 | 5/2001 | Basu et al. | |
| 6,488,076 B1 * | 12/2002 | Yasuda | F23L 7/00 165/4 |
| 2007/0137191 A1 | 6/2007 | Kweon et al. | |
| 2009/0011290 A1 | 1/2009 | Chudnovsky et al. | |

FOREIGN PATENT DOCUMENTS

EP  0953543  11/1999

OTHER PUBLICATIONS

Recuperator, Research Disclosure, Jul. 1, 1991, p. 563, No. 327, Mason Publications, Hampshie GB.

* cited by examiner

*Primary Examiner* — Steven B McAllister
*Assistant Examiner* — John E Bargero
(74) *Attorney, Agent, or Firm* — Donald T. Black

(57) ABSTRACT

Employing furnace combustion gases for both thermochemical regeneration and heating of regenerators to preheat oxidant for the furnace provides synergistic efficiencies and other advantages.

12 Claims, 4 Drawing Sheets

THERMOCHEMICAL REGENERATION WITH OXIDANT PREHEATING

RELATED APPLICATIONS

This application is a divisional of, and claims the benefit of pending U.S. application Ser. No. 15/235,689, filed on Aug. 12, 2016, which claims the benefit of U.S. Provisional Application Ser. No. 62/211,510, filed on Aug. 28, 2015.

FIELD OF THE INVENTION

The present invention relates to combustion in furnaces such as glassmelting furnaces, furnaces for heating and/or melting metals and ores; incinerators; cement kilns; and the like, wherein material is fed into the furnace and is heated and/or melted by the heat of combustion that occurs within the furnace.

BACKGROUND OF THE INVENTION

U.S. Pat. No. 6,113,874 discloses heat recovery methods useful with furnaces employing regenerators wherein a stream of combustion products formed in the furnace is passed through a first regenerator to heat the first regenerator and cool the combustion products, and then a portion of the cooled combustion products is combined with fuel to form a mixture which is passed through a second heated regenerator wherein the mixture undergoes an endothermic reaction to form syngas that then passes into the furnace and is combusted.

This patent mentions that some of the combustion products ("flue gas") can be passed from the furnace through a separate regenerator to heat this separate regenerator, following which technically pure oxygen can be passed through this heated separate regenerator to heat the oxygen which is then fed from the regenerator into the furnace for combustion.

However, what is said in this patent to be the "optimal" amount of combustion products from combustion of syngas made from a mixture of pure $CH_4$ and recycled flue gas and pure $O_2$ as oxidant to be passed from the furnace into this separate regenerator, relative to the amount of the combustion products to be passed from the furnace into the first or second regenerators that are used to provide heat for the endothermic reaction to form syngas, has been discovered by the present inventor to be not at all optimal in terms of improving the overall efficiency of the operation. Indeed, the present inventor has found that significantly improved efficiency and energy utilization are available by utilizing conditions that are not taught or suggested by what this patent discloses about apportioning the flows of combustion products to the separate regenerator relative to the flows to the first and second regenerators. Indeed, the present inventor has determined a superior basis for apportioning the flows of combustion products to the separate regenerator relative to the flows to the first and second regenerators, and has found what is the optimal apportionment of these flows of combustion products. Furthermore, the present inventor has found a preferred method to apportion the flows of combustion products to the regenerators relative to the flows to the first and second regenerators for different amounts of recycled flue gas mixed with the reforming fuel.

BRIEF SUMMARY OF THE INVENTION

One aspect of the present invention is a method of carrying out combustion in a furnace, comprising (A) combusting fuel in a furnace to produce gaseous combustion products, and (B) alternately (1) (i) passing a first amount of gaseous combustion products from the furnace into and through a cooled first regenerator to heat the first regenerator and cool said first amount of gaseous combustion products, (ii) passing a second amount of gaseous combustion products from the furnace into and through a cooled second regenerator to heat the second regenerator and cool said second amount of gaseous combustion products, (iii) passing reforming fuel and (that is, with one or more of) at least a portion of the cooled gaseous combustion products from said first regenerator, at least a portion of the cooled gaseous combustion products from said second regenerator, or at least a portion of the cooled gaseous combustion products from both of said first and second regenerators, into a heated third regenerator, (iv) reacting the gaseous combustion products and the reforming fuel in the third regenerator in an endothermic reaction under conditions effective to form syngas comprising hydrogen and carbon monoxide, and thereby cooling the third regenerator, (v) passing gaseous oxidant into and through a heated fourth regenerator to heat the gaseous oxidant and cool the fourth regenerator, and (vi) passing said syngas from said third regenerator into said furnace, passing said heated gaseous oxidant from the fourth regenerator into the furnace, and combusting the syngas and said heated gaseous oxidant in the furnace;

while maintaining (C1), (C2), or both (C1) and (C2):

(C1) maintaining the ratio of the molar flow rate of said first amount of cooled gaseous combustion products which is passed from said first regenerator to the molar flow rate of said cooled second amount of gaseous combustion products which is passed from said second regenerator at from 45:55 to 65:35;

(C2) maintaining the difference in temperatures of the combustion products passing out of said first and second regenerators at 300 F or less; and (2) (i) passing a first amount of gaseous combustion products from the furnace into and through a cooled third regenerator to heat the third regenerator and cool said first amount of gaseous combustion products, (ii) passing a second amount of gaseous combustion products from the furnace into and through a cooled fourth regenerator to heat the fourth regenerator and cool said second amount of gaseous combustion products, (iii) passing reforming fuel and (that is, with one or more of) at least a portion of the cooled gaseous combustion products from said third regenerator, at least a portion of the cooled gaseous combustion products from said fourth regenerator, or at least a portion of the cooled gaseous combustion products from both of said third and fourth regenerators, into a heated first regenerator, (iv) reacting the gaseous combustion products and the reforming fuel in the first regenerator in an endothermic reaction under conditions effective to form syngas comprising hydrogen and carbon monoxide, and thereby cooling the first regenerator, (v) passing gaseous oxidant into and through a heated second regenerator to heat the gaseous oxidant and cool the second regenerator, and (vi) passing said syngas from said first regenerator into said furnace, passing said heated gaseous oxidant from the second regenerator into the furnace, and combusting the syngas and said heated gaseous oxidant in the furnace;

while maintaining (D1), (D2), or both (D1) and (D2):

(D1) maintaining the ratio of the molar flow rate of said first amount of cooled gaseous combustion products which is passed from said first regenerator to the molar flow rate of said cooled second amount of gaseous combustion products which is passed from said second regenerator at from 45:55 to 65:35;

(D2) maintaining the difference in temperatures of the combustion products passing out of said first and second regenerators at 300 F or less.

In a preferred embodiment of this aspect of the invention, at the end of steps (B) (1)(iii) and (B)(1)(v) the flows of said reforming fuel to said third regenerator and of said oxidant to said fourth regenerator are terminated and gaseous combustion products from the furnace are flowed through said third and fourth regenerators so that syngas in the third regenerator and oxidant in the fourth regenerator are expelled to the furnace and combusted to completion, and at the end of steps (B) (2)(iii) and (B)(2)(v) the flows of said reforming fuel to said first regenerator and of said oxidant to said second regenerator are terminated and gaseous combustion products from the furnace are flowed through said first and second regenerators so that syngas in the first regenerator and oxidant in the second regenerator are expelled to the furnace and combusted to completion.

Another aspect of the present invention is a method of carrying out combustion in a furnace, comprising
(A) combusting fuel in a furnace to produce gaseous combustion products, and
(B) alternately (1) (i) passing a first amount of gaseous combustion products from the furnace into and through a cooled first regenerator to heat the first regenerator and cool said first amount of gaseous combustion products,
(ii) passing a second amount of gaseous combustion products from the furnace into and through a cooled second regenerator to heat the second regenerator and cool said second amount of gaseous combustion products,
(iii) passing reforming fuel into and through a heated third regenerator to heat the reforming fuel and cool the third regenerator,
(iv) passing gaseous oxidant into and through a heated fourth regenerator to heat the gaseous oxidant and cool the fourth regenerator, and
(v) passing said heated reforming fuel from said third regenerator into said furnace, passing said heated gaseous oxidant from the fourth regenerator into the furnace, and combusting said heated reforming fuel and said heated gaseous oxidant in the furnace;
while maintaining (C1), (C2), or both (C1) and (C2):
(C1) maintaining the ratio of the molar flow rate of said first amount of cooled gaseous combustion products which is passed from said first regenerator to the molar flow rate of said cooled second amount of gaseous combustion products which is passed from said second regenerator at less than 65:35 and at least 45:55;
(C2) maintaining the difference in temperatures of the combustion products passing out of said first and second regenerators at 300 F or less; and
(2) (i) passing a first amount of gaseous combustion products from the furnace into and through a cooled third regenerator to heat the third regenerator and cool said first amount of gaseous combustion products,
(ii) passing a second amount of gaseous combustion products from the furnace into and through a cooled fourth regenerator to heat the fourth regenerator and cool said second amount of gaseous combustion products,
(iii) passing reforming fuel into a heated first regenerator to heat the reforming fuel and cool the first regenerator,
(iv) passing gaseous oxidant into and through a heated second regenerator to heat the gaseous oxidant and cool the second regenerator, and
(v) passing said heated reforming fuel from said first regenerator into said furnace, passing said heated gaseous oxidant from the second regenerator into the furnace, and combusting said heated reforming fuel and said heated gaseous oxidant in the furnace;
while maintaining (D1), (D2), or both (D1) and (D2):
(D1) maintaining the ratio of the molar flow rate of said first amount of cooled gaseous combustion products which is passed from said first regenerator to the molar flow rate of said cooled second amount of gaseous combustion products which is passed from said second regenerator at less than 65:35 and at least 45:55;
(D2) maintaining the difference in temperatures of the combustion products passing out of said first and second regenerators at 300 F or less. In a preferred embodiment of this aspect of the invention, at the end of step (B) (1)(iii) the flow of said reforming fuel to said third regenerator is terminated and gaseous combustion products from said furnace are flowed or continue to flow through said third regenerator into the furnace to reduce the amount of soot present in the third regenerator, and wherein at the end of step (B) (2)(iii) the flow of said reforming fuel to said first regenerator is terminated and gaseous combustion products from said furnace are flowed or continue to flow through said first regenerator into the furnace to reduce the amount of soot present in the first regenerator.

By "at least a portion" or "some" is meant, an amount greater than 0%, and less than or equal to 100%.

DETAILED DESCRIPTION OF THE INVENTION

Figure 1:
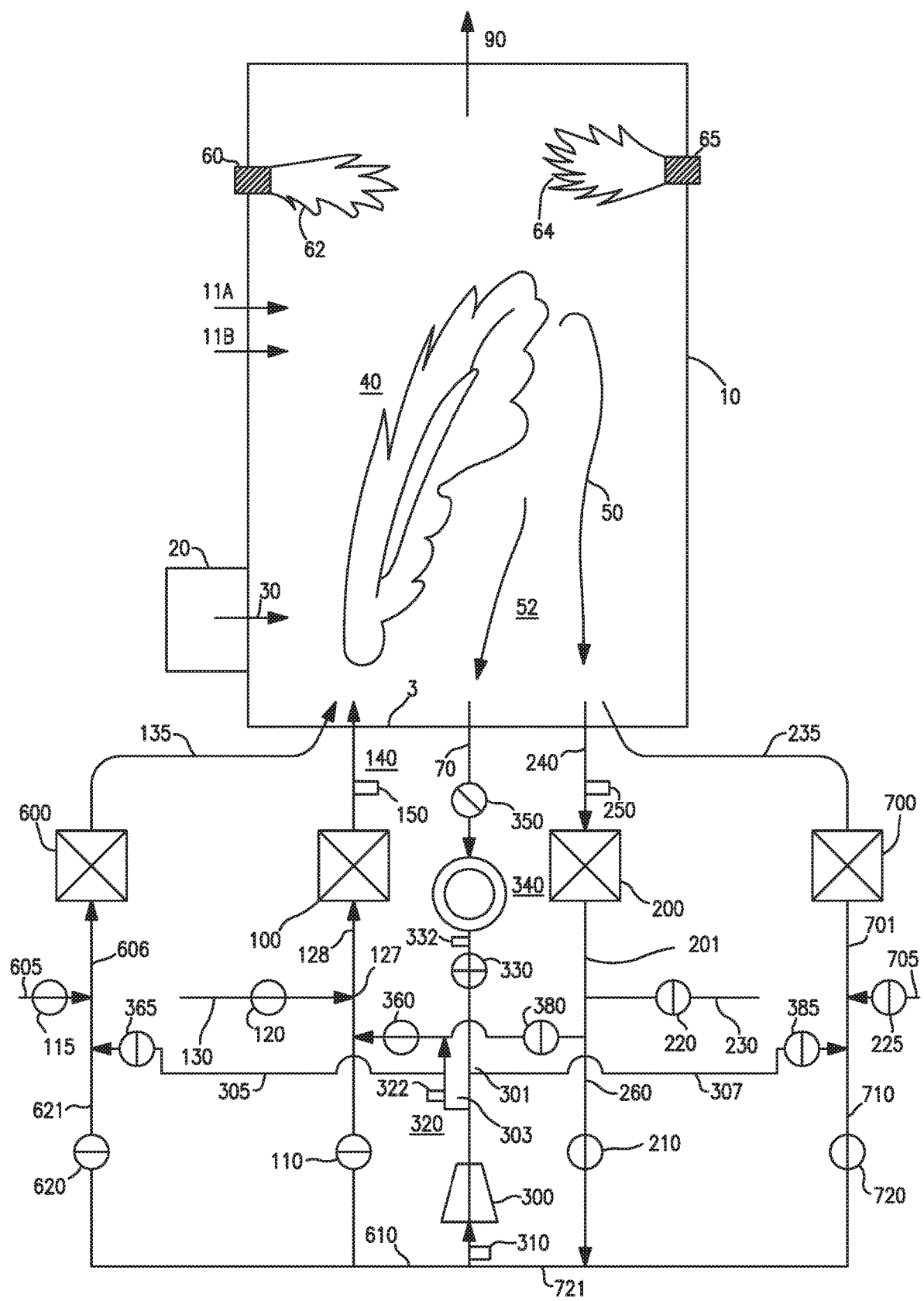
FIGS. 1-3 are schematic representations of different aspects of the present invention.

The present invention is useful in furnaces such as glass-melting furnaces, furnaces for heating and/or melting metals and ores; incinerators; cement kilns; and the like, wherein material is fed into the furnace and is heated and/or melted by the heat of combustion that occurs within the furnace. The combustion occurs between fuel, which can be any combustible gaseous hydrocarbon or atomized liquid hydrocarbon (preferably comprising C1-C4 compounds such as methane) as well as the syngas that is produced as described herein, and gaseous oxidant which includes air and any gaseous mixture containing more oxygen than air. In the accompanying FIG. 1, the additions of fuel and oxidant that may occur are represented as 11A and 11B respectively.

The present invention is described herein in particular detail with respect to a preferred type of furnace, namely one that employs a heat recovery process which recaptures usable heat from high temperature flue gas exhaust streams. This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, by which is meant combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher H2O and CO2 concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another regenerator and mixed with a stream of fuel (referred to herein as Reforming Fuel or RF). In the following description, pure methane ($CH_4$) is described as reforming fuel for purposes of illustration. Other satisfactory reforming fuels include any combustible gas containing significant concentration of hydrocarbons, gas mixture, or vaporized liquid fuels including, but not limited to, natural gas, propane, and LPG (liquefied petroleum gas). Fuels that predominantly comprise H2 and CO such as producer gas generated by gasifying coal are not suitable as Reforming Fuel. Thus, the reforming fuel should comprise at least 25 vol. % of one or more gaseous hydrocarbons of the formula $CH_4$ and/or $C_XH_Y$ wherein X is 2-4 and Y is X to (4X−2). In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RGF/RF mixture passes through the second regenerator, it reaches a temperature at which thermal dissociation reactions and reforming reactions begin to occur and continue to occur, producing products including H2 and CO. These reactions are endothermic and the heat needed to promote these reactions is absorbed from the heated checker. Thermal dissociation reactions of fuel are known as cracking reactions and produce many fuel species such as H2, C2H2, C2H4, and soot. The reforming reactions produce a gaseous composition which typically comprises one or more components such as such as H2, CO, and unreacted gases comprising H2O, CO2 and CH4. The gaseous composition thus produced may also be called "syngas" herein. The mixture of gaseous products emerges from the second regenerator into the furnace wherein the combustible gaseous components are combusted with oxidant to provide thermal energy for heating and/or melting material in the furnace. This combustion may combust a portion of any soot present with the gaseous products as well.

As described more fully below, gaseous oxidant for combustion in the furnace is heated before it is fed into the furnace. It is heated by passing it into and through a regenerator that has previously been heated. At the same time, a portion of the gaseous combustion products formed in the furnace are passed out of the furnace through another regenerator, to heat that regenerator.

After a length of time, the operation of the two regenerators is reversed, i.e., the regenerator that was used in the flue cycle is switched to the reforming cycle, and the regenerator that was used in the reforming cycle is switched to the flue cycle. Prior to the reversal the flow of reforming fuel is stopped and the flow of RFG (recycled flue gas, that is, recycled gaseous combustion products) is continued until some or all of the residual reforming fuel and syngas in the regenerator are purged out of the regenerator and combusted in the furnace. As described further below, this purging step also acts to remove soot deposited on checker surfaces in the regenerator as soot reacts with RFG and is gasified. Upon this reversal, the regenerator that was heated by outgoing flue gas is switched to start heating incoming oxidant, and the regenerator that was used to heat incoming oxidant is switched so that flue gas exiting the furnace passes through it in order to reheat it for use in heating oxidant. After a further period of time, the operation of the two pairs of regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close based on specific timings.

The operation and control of the present invention is described below in conjunction with FIGS. 1 to 3. An end-port fired glass furnace (10) fitted with two regenerators in end wall (3) is used as an example.

As shown in FIG. 1, end-port glass furnace (10) has a feed station (20) where feed material (30) comprising solid glassmaking materials (known as batch and/or cullet) are charged into the furnace to be heated and melted. The flow of molten glass out of furnace (10) is represented as (90). The furnace (10) is equipped with first regenerator (100) on the furnace left side and second regenerator (200) on the furnace right side. Vertical cross-sectional views of the two regenerators are displayed in more detail in FIGS. 2 and 3.

Figure 2:
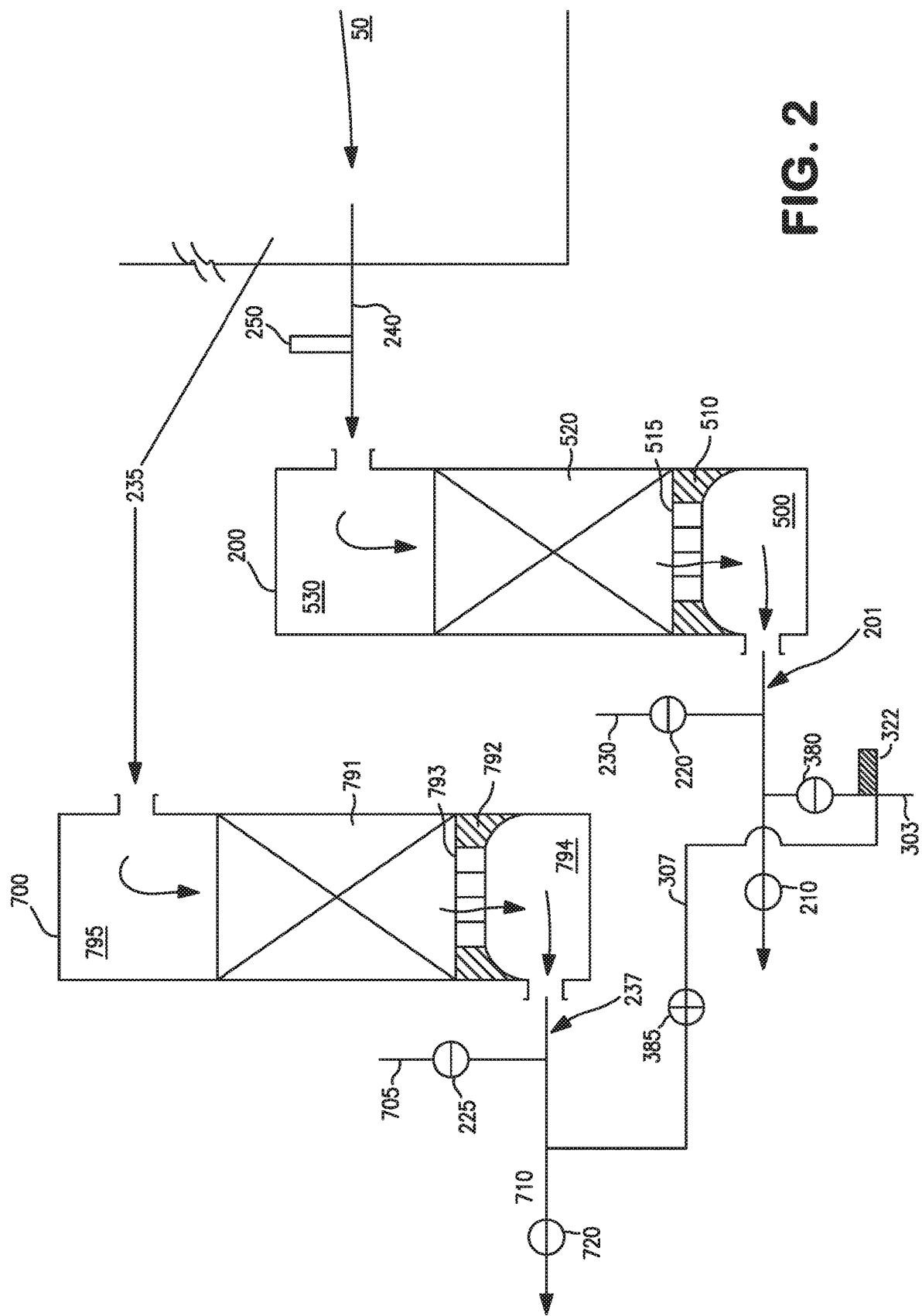

As seen in FIG. 2, regenerator (200) is in the flue cycle wherein flue gas stream (50) from the interior of furnace (10) enters port neck (240) and then flows to the top space (530) of regenerator (200) past an oxygen analyzer (250). The flue gas stream heats checkers (represented as (520)) as it flows through passages between the checkers within regenerator (200), and enters chamber bottom space (500) through gas passages (515) supported on arch (510) which also supports the weight of the whole bed of checkers. As seen in FIG. 1, a portion (52) of the flue gases produced in furnace (10) may be by-passed to conduit (70) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas goes to regenerator (200) as flue gas stream (50).

As seen in FIGS. 1 and 2, the cooled flue gas stream (201) exits the regenerator (200) in conduit (260), passes through an open valve (210) and oxygen sensor (310), and then enters the suction-side of blower (300). The majority of the flue gas (301) leaving the pressure-side of the blower passes through a damper (330) then a flow meter (332), and finally is directed into stack (340) through which this flue gas leaves the system to exhaust as defined herein. A portion (303) of the flue gas is recycled to the bottom of regenerator (100) by passing through conduit (320) and valve (360). This is Recycled Flue Gas (RFG). Its flow is metered by a flow meter (322). Reforming fuel which is to be fed to the second regenerator (100) is supplied by a conduit (130) through valve (120).

Suitable reforming fuels include methane (which is preferred) as well as any other combustible gas, gas mixture, or vaporized liquid fuels including, but not limited to, natural gas, propane, and LPG (liquefied petroleum gas).

Figure 3:
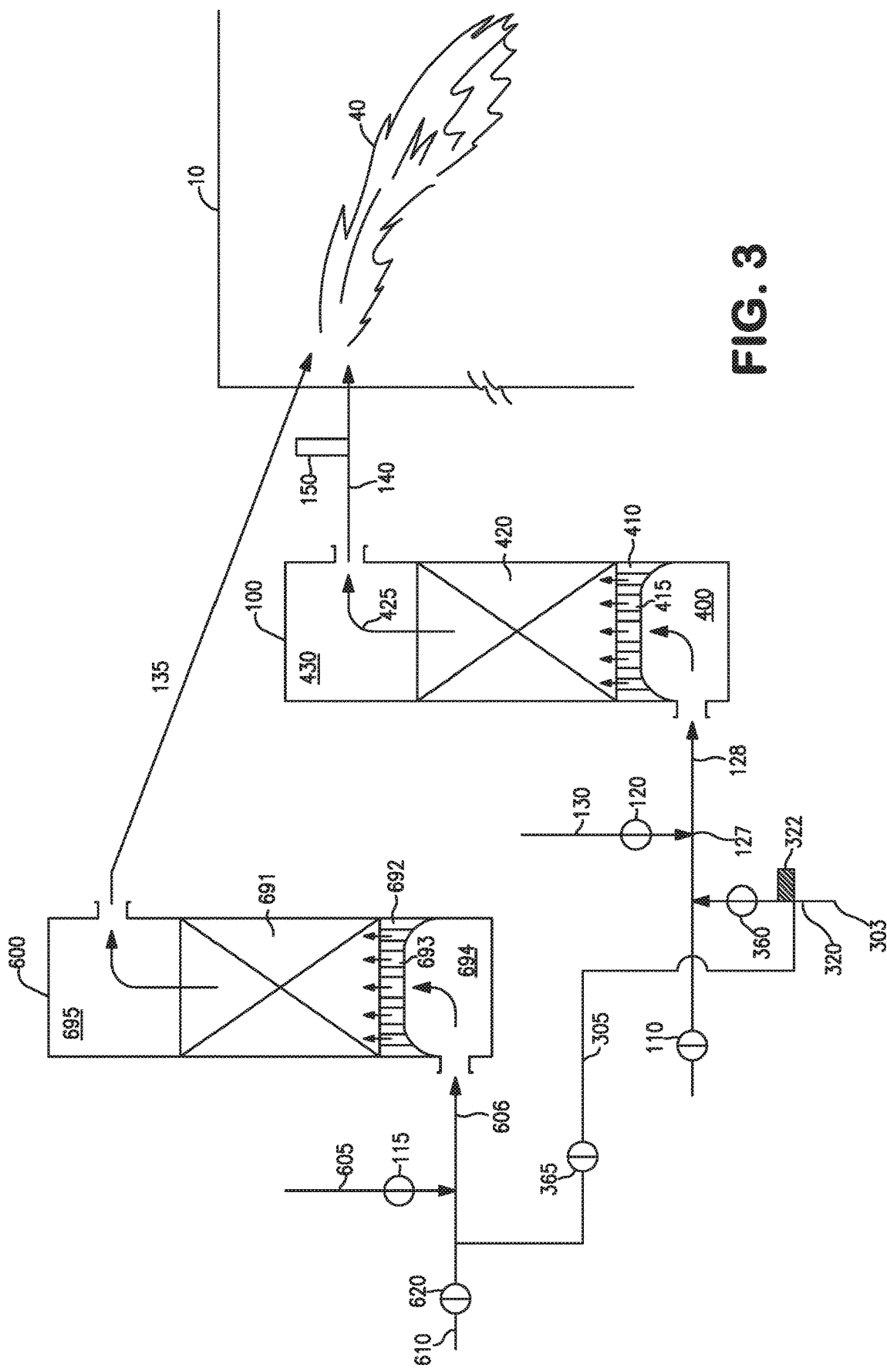

As seen in FIG. 3, the reforming fuel (RF) from conduit (130) intersects and mixes with the RFG (303) at location (127) in conduit (128) which also communicates with the bottom space (400) of regenerator (100). This RFG/RF mixture enters the already pre-heated checker pack (420) of regenerator (100) through gas passages (415) on arch (410). Regenerator (100) has already been heated in a previous cycle by passage of flue gas from the furnace into and through the regenerator (100). The temperature of the RFG/RF mixture increases as it flows through the checker pack of regenerator (100). When the temperature of the RFG/RF becomes sufficiently high, thermal dissociation reactions and endothermic reforming reactions occur in which the reforming fuel (e.g. $CH_4$) reacts with CO2 and H2O in the RFG and forms CO, H2, and possibly some soot. The required heat for the endothermic dissociation and reforming reactions is taken from the heated checkers. The reforming reaction continues as the RFG/RF mixture continues to travel toward the top space (430). The gaseous stream (425) (referred to herein as a "reformed" or "syngas" gas stream) exits from the top of checker pack (420). Stream (425) has high temperature and includes species such as CO, H2, unreacted $CH_4$, and unreacted CO2 and H2O. The stream (425) passes through port neck (140) and oxygen sensor (150), and enters furnace (10). This stream exits checker pack (420) at temperatures for example ranging from 1800 F to 2500 F.

In this cycle of operation, referring to FIGS. 1 and 3, heated oxidant for combustion of the syngas is supplied to furnace (10) through conduit (135). The oxidant can be air, or it can have an oxygen content higher than that of air, i.e. at least 21 vol. %, and preferably equal to or higher than 80 vol. %, more preferably equal to or higher than 90 vol. %, or even at least 99 vol. %. The oxidant is provided from a suitable source such as a storage tank or an air separation unit (examples of which are known and commercially available) through conduit (605) and into and through heated regenerator (600). Regenerator (600) can have the customary structure and mode of operation in which checker pack (691) is supported on arch (692) through which gas passages (693) are present that permit gas to flow between the checker pack (691) and bottom space (694). In this cycle of operation, gaseous oxidant flows from line (606) into bottom space (694), into and through checker pack (691), to top space (695) and into line (135). The oxidant is heated in regenerator (600) and passes from regenerator (600) into conduit (135) and into the furnace. Valve (115) is open to permit flow of oxidant into line (606) through which oxidant passes into regenerator (600). Valve (620), which controls flow of flue gas through and out of regenerator (600) into conduit (610) which is connected to the inlet (suction-side) of blower (300), is closed in this cycle. In the other cycle, described herein, the valve positions are reversed, and flue gas flows from line (135) into and through regenerator (600) in the opposite path to line (606).

In this cycle of operation, referring to FIGS. 1 and 2, some of the gaseous combustion products (flue gas) passes out of the furnace (10) into conduit (235) and thence into and through regenerator (700). Regenerator (700) can have the customary structure and mode of operation in which checker pack (791) is supported on arch (792) through which gas passages (793) are present that permit gas to flow between the checker pack (791) and bottom space (794). This flow of combustion products from line (235) heats regenerator (700). The combustion products are cooled and exit regenerator (700) via conduit (710) and then enter the inlet (suction-side) of blower (300). Valve (720), which controls flow of flue gas through and out of regenerator (700) into conduits (710) and (721), is open in this cycle, and valve (225) which controls flow of oxidant from a suitable source such as a storage tank or an air separation unit from conduit (705) into and through heated regenerator (700) in the next cycle, is closed. In the other cycle, described herein, the valve positions are reversed, and flue gas flows from line (237) into and through regenerator (700) in the opposite path to line (235) and into furnace (10).

Typically, the heat recovery process proceeds with one of the regenerators (100) and (200) in the flue cycle and one of these regenerators in the reforming cycle, as seen in FIG. 1, and with one of the oxidant regenerators (600) and (700) in oxidant-heating mode and one being reheated by flue gas passing through it, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, and oxidant was heated in regenerator (600) and fed into the furnace while gaseous combustion products were leaving furnace (10) and heating regenerator (700), the operation of furnace (10) undergoes reversal in which regenerator (200) is transitioned to the reforming cycle for heat recovery, regenerator (100) is transitioned into the flue cycle for heat accumulation, regenerator (600) is transitioned to receive flue gas in order to reheat regenerator (600), and regenerator (700) is transitioned to receive and heat oxidant passing through it into the furnace.

Before the reversal, remaining syngas in regenerator (100) and remaining oxidant in regenerator (600) are to be purged to furnace (10). In this instance, reforming fuel supplied to the regenerator (100) and oxidant supplied to regenerator (600) are terminated at first by closing valve (120) and valve (115) respectively and opening oxidant purge line valve (365) to let RFG from blower (300) flow through lines (320) and (305) through valve (365) to line (606). Remaining syngas in regenerator (100) and remaining oxidant in regenerator (600) are purged by the RFG for a specified amount of time so that all or nearly all the syngas in the regenerator (100) and all or nearly all of the oxidant in regenerator (600) are expelled to the furnace and combusted to completion. Flowing, or continuing the flow, of gaseous combustion products through regenerators (100) and (600), also aids in removing soot that may have accumulated within the regenerators as a byproduct of reforming reactions and/or thermal cracking of the substances fed into the regenerators. Soot removal occurs by gasification reactions with reactants that may be present in the gaseous combustion products (RFG) such as O2, dissociated oxygen species, carbon dioxide, and/or water vapor.

Upon reversal, the flue gas from the furnace passes through regenerator (100), and a portion thereof passes to exhaust (as defined herein) while a portion or the balance is mixed with fuel and the mixture is passed through regenerator (200) and into the furnace. Valve (110) which had been closed is opened, valve (210) is closed, and valve (360) is closed and valve (380) which had been closed is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, as no combustion aided by oxidant through valve (115) occurs in this phase, and valve (225) is opened. The resulting mixture of reforming fuel and recycled flue gas undergoes in regenerator (200) the endothermic reforming reactions which had occurred in regenerator (100) in the previous cycle as described herein, to produce syngas which passes into and through port neck (240) and then into furnace (10) where it is combusted with oxidant from conduit (237) that has been heated after being fed through valve (225). In addition, upon reversal, flue gas passes through regenerator (600) and the flow of oxidant through regenerator (600) is shut off, whereas flow of flue gas from the furnace through regenerator (700) is shut off and flow of oxidant through regenerator (700) into the furnace commences. Valves (115) and (720) are closed, and valves (620) and (225) are opened.

Before the reversal, remaining syngas in regenerator (200) and remaining oxidant in regenerator (700) are to be purged to furnace (10). In this instance, reforming fuel supplied to the regenerator (200) and oxidant supplied to regenerator (700) are terminated at first by closing valve (220) and valve (225) respectively and opening oxidant purge line valve (385) to let RFG flow from blower (300) from line (301) through line (307) to lines (710) and (701). Remaining syngas in regenerator (200) and remaining oxidant in regenerator (700) are purged by the RFG for a specified amount of time so that nearly all the syngas in the regenerator (200) and all of the oxidant in regenerator (700) are expelled to the furnace and combusted to completion.

Thus it can be seen that in one cycle, recycled flue gas (721) that is fed with reforming fuel (130) to regenerator (100) can comprise recycled flue gas from regenerator (200), recycled flue gas from regenerator (700), or recycled flue gas from both regenerators (200) and (700). In the other cycle, recycled flue gas (610) that is fed with reforming fuel (230) to regenerator (200) can comprise recycled flue gas from regenerator (100), recycled flue gas from regenerator (600), or recycled flue gas from both regenerators (100) and (600).

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (100) or (200) as the case may be is undergoing the purging sequence described above. For maximum heat recovery, it is preferred that burners (60) and (65) are not co-firing with the syngas flame (40). It is also preferred that during the purging sequence, burners (60) and (65) are not firing.

The present invention utilizes the above-described apparatus to attain unexpected objectives, by operating in accordance with guidelines that have not previously been recognized.

As indicated, in each cycle gaseous combustion products are being withdrawn from the furnace and passed in parallel through each of a pair of regenerators, with one portion of the gaseous combustion products being passed through a regenerator to provide heat to the regenerator that will in the next cycle heat the mixture of combustion products and fuel to be reformed in the endothermic reforming reaction, and with another portion of the gaseous combustion products being passed through a regenerator to provide heat to the regenerator that will in the next cycle heat gaseous oxidant that is passed through the regenerator into the furnace.

It has been unexpectedly discovered that in each such cycle, the pair of regenerators through which gaseous combustion products are passed should be operated so as to maintain either or both of two sets of conditions. One set of conditions is that the ratio between the molar flow rate of the gaseous combustion products flowing from the regenerator that will be used to provide heat to the endothermic reaction in the next cycle, and the molar flow rate of the gaseous combustion products flowing from the regenerator that will be used to preheat oxidant that will be heated and passed into the furnace in the next cycle, should be maintained so that this ratio is less than 70:30 when the RFG/RF molar ratio is 1:1 and the ratio of the molar flue gas flow rate to the molar RFG/RF mixture flow rate is 2:1. Preferably this ratio is less than 65:45, and at least 55:45. A more preferred range for this ratio is (57 to 65):(43 to 35).

Contrary to the prior teaching of U.S. Pat. No. 6,113,874 the present inventor has also discovered that it is advantageous to operate the reforming regenerator at RFG/RF molar ratio below 0.5, or even without RFG flow, i.e., at RFG/RF molar ratio of 0, when oxidant to be fed into the furnace is heated in a separate regenerator that has been heated by flowing flue gas through it from the furnace. When no RFG is mixed with RF, no reforming reactions can take place; however, some of the fuel components will crack to form hydrogen, $C_2H_4$, $C_2H_2$, soot, and many other species. These cracking reactions are also endothermic and contribute to the recovery of heat into the gaseous species from the regenerator. When no recycled flue gas is mixed with "reforming fuel", the ratio between the molar flow rate of the gaseous combustion products flowing from the regenerator that was used to heat the regenerator and thus provide heat to the endothermic reaction in the next cycle, and the molar flow rate of the gaseous combustion products flowing from the regenerator that was used to preheat oxidant that will be heated and passed into the furnace in the next cycle, should be maintained so that this ratio is less than 65:35. Preferably this ratio is less than 60:40, and more preferably at least 50:50. A more preferred range for this ratio is (55 to 60):(45 to 40).

It is particularly advantageous that the total amount of combustion products exiting the furnace are those in the two ducts feeding combustion products into the regenerators. The desired relationship between the respective molar flow rates can be monitored and implemented by appropriate metering devices in the conduit placed downstream of each regenerator, and by appropriate setting of the valves that regulate the rate of flow of gases in each conduit. For instance, in one cycle these molar flow rates are those in conduit (201) and (710), so (as will already have been recognized from the description herein and the FIGS. 1-3) the desired adjustments in the flow rates would be established by setting the valves (210) and (720) to positions between full-flow and shut-off that permit the desired rates of flow that would achieve the desired molar flow ratios or the desired relatively close temperatures of the respective streams, as described herein. Similarly, in the other cycle these molar flow rates are those in conduits (128) and (621), so the control would be effected by settings of valves (110) and (620).

Another set of conditions to maintain in accordance with the present invention is to provide that the temperatures of the flows of gaseous combustion products exiting each pair of regenerators through which combustion products flow in each alternating cycle (that is, referring to FIG. 1, regenerators (200) and (700) in one cycle, and regenerators (100) and (600) in the other cycle, should be within 300 F or less of each other, preferably within 200 F, and more preferably within 100 F or less of each other. Stated another way, the temperature difference between these two flows of gaseous combustion products should be 300 F or less, preferably 200 F or less, more preferably 100 F or less. Referring to FIG. 1, this refers to the difference between the temperatures of streams (201) and (710) in one cycle, and the difference between the temperatures of streams (128) and (621) in the other cycle. These temperatures can readily be measured and compared using equipment that is conventional and commercially available. One advantageous manner for maintaining the respective temperature differences within the indicated proximity to each other is by adjusting the molar flow rates of each of the streams of combustion products from the furnace into and through each regenerator that is heated by the combustion products in a given cycle.

Typical temperatures are provided here for operation of the invention with a glassmaking furnace. The temperatures may be somewhat lower when the invention is operated with other types of furnaces such as steel reheating furnaces.

Referring to the cycle described with respect to FIGS. 1-3, flue gas stream (240) entering regenerator (200) is typically at 2500 F to 3000 F, and stream (201) exiting regenerator (200) is typically at 500 F to 1000 F. Stream (235) entering regenerator (700) is also typically at 2500 F to 3000 F, and stream (701) exiting regenerator (700) is typically at 500 F to 1000 F. Stream (128) of mixed recycled flue gas and reforming fuel entering regenerator (100) is typically at 300 F to 1000 F, and stream (140) of reformed product is typically at 1800 F to 2400 F. Stream (606) of oxidant entering regenerator (600) is typically at zero degrees F. or ambient temperature, up to 100 F. Stream (135) of heated oxidant exiting regenerator (600) is typically at 1800 F to 2400 F.

The temperatures within each regenerator will be expected to rise and fall through each cycle, and the temperatures will be different at different locations within the regenerators. In the typical operation of the invention with a glassmelting furnace, in the cycle depicted in FIGS. 1-3, the temperatures within regenerator (200) at the start of the cycle may be on the order of 500 F to 900 F at the bottom of the regenerator and 1800 F to 2300 F at the top, and may be expected to rise by the end of this cycle to temperatures on the order of 600 F to 1000 F at the bottom and 1900 F to 2400 F at the top. In the same cycle, the temperatures within regenerator (700) at the start of the cycle may be on the order of 500 F to 900 F at the bottom of the regenerator and 1800 F to 2300 F at the top, and may be expected to rise by the end of this cycle to temperatures on the order of 600 F to 1000 F at the bottom and 1900 F to 2300 F at the top. In the same cycle, the temperatures within regenerator (100) at the start of the cycle may be on the order of 600 F to 1000 F at the bottom of the regenerator and 1900 F to 2400 F at the top, and may be expected to be cooled by the end of this cycle to temperatures on the order of 500 F to 900 F at the bottom and 1800 F to 2300 F at the top. In the same cycle, the temperatures within regenerator (600) at the start of the cycle may be on the order of 600 F to 1000 F at the bottom of the regenerator and 1900 F to 2400 F at the top, and may be expected to be cooled by the end of this cycle to temperatures on the order of 500 F to 900 F at the bottom and 1800 F to 2300 F at the top.

These figures would be expected if the cycle is reversed approximately every 20 minutes. When the cycle is reversed less often, the difference between the temperatures at the beginning and end of each cycle (100 F in this example) would be expected to be larger, and even twice, i.e., about 200 F, as large as these figures if the cycles are reversed half as often, that is, every 40 minutes.

EXAMPLE

The following table shows approximate gas flow rates per one molar flow of fuel (CH$_4$ or natural gas [NG]) for a container glass furnace using as feed material 30% cullet and 70% batch. Heating and melting the feed materials generates about one mole of batch gases in the furnace per mole of fuel fed to the furnace. Batch gases are predominantly CO$_2$ decomposed from carbonate materials in the batch and H$_2$O evaporated from the moisture in the batch and cullet fed to the furnace. The flue gas flow rate (5 moles) from a glass furnace equipped with the thermochemical regenerator system described herein including regenerators (100) and (200) (referred to in this Example as "TCR") which uses recycled flue gas (RFG) is much greater than the flue gas flow rate (3 moles) generated from combustion of fuel (CH$_4$) and pure O$_2$ alone.

|  | Approximate Gas Flow ratios (molar) |
| --- | --- |
| Fuel (CH4) | 1 |
| Oxidant (100% O2) | 2 |
| Combustion Flue gas (CO2 + 2H2O) | 3 |
| Batch gases (CO2, H2O) | 1 |
| Flue gas with no RFG | 4 |
| Recycled flue gas (RFG) | 1 |
| Flue gas with RFG | 5 |

Figure 4:
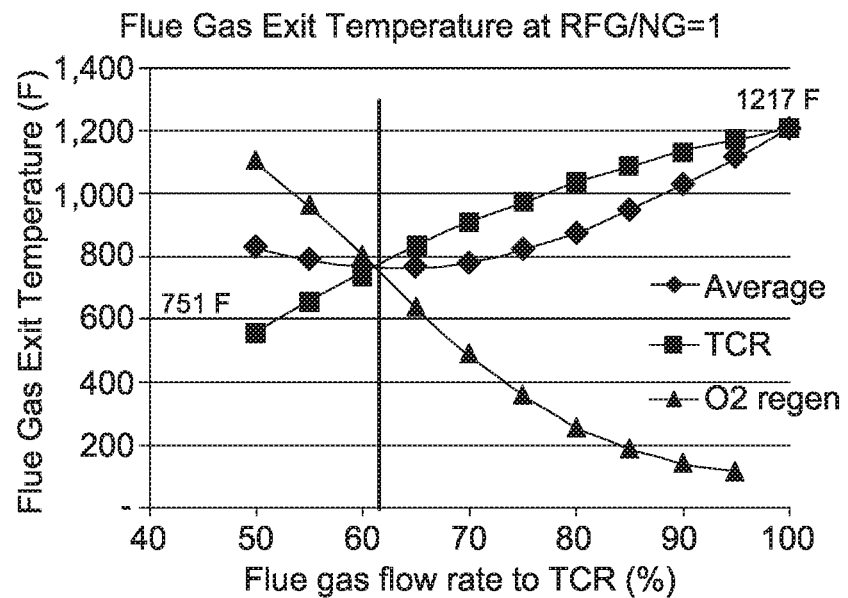
FIGS. 4 and 5 are graphs of flue gas temperature against flue gas flow ratios obtained in accordance with the Example provided below.
Figure 5:
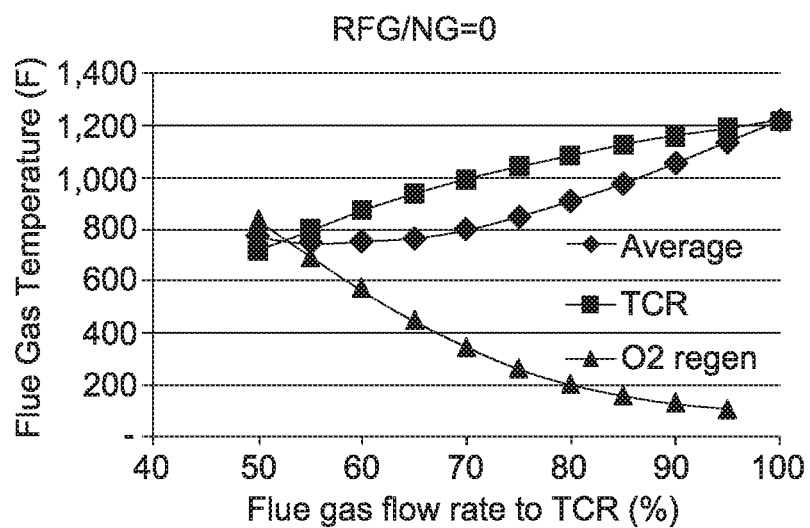

In order to find the optimum flow ratio of flue gas from the furnace into the TCR and into the O$_2$ regenerators (600) and (700), two separate heat exchanger models were set up, one for the TCR and the other for the O$_2$ regenerator. The maximum heat recovery from the flue gas, i.e., the most efficient operation, is achieved when the total sensible heat contained in the two flue gas streams exiting the two regenerators is minimized. In FIGS. 4 and 5 the flue gas exit temperatures from the TCR regenerators and from the O$_2$ regenerators and the average temperature of the combined stream when the two streams are mixed after the exiting the regenerators (i.e., molar flow weighted average flue gas temperature) are plotted against the portion (in molar percent) of the total flue gas flow directed to the TCR regenerators. The flue gas exit temperature from the TCR regenerators increases as more flue gas is directed to the TCR. The flue gas exit temperature from the O$_2$ regenerators, on the other hand, decreases with increasing flue gas flow to the TCR. Since the total sensible heat in the combined stream is approximately proportional to the average temperature of the combined stream, the optimum ratio of the flue gas flow to the TCR regenerators is located at the point where the average flue gas temperature becomes the minimum value.

FIG. 4 represents a case at RFG/NG=1 (molar). The optimum flow ratio (that is, the molar percentage) of the flue gas that is fed to the TCR with the balance being fed to the O$_2$ regenerator) which gives the lowest average flue gas exit temperature of the combined streams is about 62% in this case. It does not change much when the flue gas flow ratio to the TCR is between 55 to 70% and below about 800 F in this example. At the flue gas flow ratio to the TCR of 55% the flue gas exit temperature from the O$_2$ regenerator is about 300 F hotter than the flue gas temperature from the TCR. At the flue gas flow ratio to the TCR of 70% the flue gas exit temperature from the O$_2$ regenerator is about 300 F colder than the flue gas temperature from the TCR. At the flue gas flow ratio to the TCR of about 61% the flue gas exit temperatures from the two regenerators are equal. This point is very close to the optimum flow rate. Since it is easier and more reliable to measure temperature by a thermocouple than to measure the flow rate of flue gas containing sticky particulates, the preferred method in this invention is to find a near optimum flow gas flow ratio by measuring the flue gas exit temperature or the regenerator bottom temperature of each regenerator and adjusting the flow rates to the TCR and to the $O_2$ regenerator until the two temperatures are within about 300 F, preferably within 200 F, and more preferably within 100 F. Alternatively a single thermocouple located in the downstream conduit, after the two flue gas streams have been fully mixed, can be used to find the minimum flue gas temperature. This method, however, is not sensitive to the change in the flow rates to the TCR and to the $O_2$ regenerator.

FIG. 5 represents the case with no recycled flue gas used for reforming reactions (i.e., RFG/RF=0). The optimum flow ratio to the TCR that gives the lowest average flue gas exit temperature of the combined streams is about 58% in this example. The average flue gas exit temperature of the combined streams does not change much when the flue gas flow ratio to the TCR is between 50 to 65% and below about 800 F in this case. At the flue gas flow ratio to the TCR of 50% the flue gas exit temperature from the $O_2$ regenerator is about 100 F hotter than the flue gas temperature from the TCR. At the flue gas flow ratio to the TCR of 65% the flue gas exit temperature from the $O_2$ regenerator is about 500 F colder than the flue gas temperature from the TCR. At the flue gas flow rate to the TCR of about 53% the flue gas exit temperatures from the two regenerators are equal. This point is 5% less than the optimum flow rate, but the heat recovery efficiency is very close to that of the optimum flow rate.

Thus the practical method to find a near optimum flue gas flow ratio found for the previous case is also applicable in this case.

The above examples indicate that the optimum flow ratio depend on fuel composition, oxidant composition, RFG/NG ratio, and batch/cullet ratio. However for a large change of RFG/NG ratio of 0 to 1 the optimum flow ratio was found to be similar.

It has been discovered that operating in a manner that maintains the ratio of molar flow rates of combustion product streams entering the respective regenerators, or that maintains the indicated controlled difference in the temperatures of the flows of combustion products exiting the respective regenerators, or that maintains both relationships (i.e. the molar flow rate ratio, and the temperature difference of the streams as described), attains superior heat recovery and efficiency of energy utilization (storage and reuse in each regenerator) that is superior to what appears to be suggested or available in the prior art such as the aforementioned U.S. Pat. No. 6,113,874 wherein optimal heat efficiency was taught as requiring operation under conditions which when analyzed correspond to the aforementioned ratio of molar flow rates being not less than 70:30. However, the present invention is all the more unexpected in that the aforementioned patent did not ascribe any particular recognition to this ratio of molar flow rates nor to the significance of the relationship between the temperatures of the respective flows of combustion products.

In the preceding sections the present invention is described under the preferred conditions that all of the fuel, as methane (CH4), and all of the oxidant, as industrially pure (at least 99.9 vol. % pure) oxygen, that are introduced into the furnace are heated or reformed in the regenerators. For cases in which some of the fuel and/or some of the oxidant are introduced into the furnace without having been heated or reformed in regenerators, and for cases in which the oxygen concentration of the oxidant is less than 99.9%, the optimum ratio of the molar flow rates of the gaseous combustion products (flue gas) from the furnace through the first and second regenerators, and the optimum ratio of the molar flow rates of the gaseous combustion products from the third and fourth regenerators (for passage into the reforming and oxidant-heating regenerators) changes from the optimum ratios for the preferred conditions mentioned above. For example if 30% of the combustion oxidant is injected into the furnace directly without preheating (for instance, for a staged combustion to reduce NOx emission), the flow rate of oxidant into the oxidant-preheating regenerators is reduced by that 30%. In this case the flow rate of flue gas into the oxidant-preheating regenerators should be reduced by about 20 to 25% and the flow rate of flue gas into the reforming regenerator should be increased by that amount. Thus, the optimum ratio of the molar flow rates of the flue gas from the furnace through the first regenerator relative to the molar flow rate through the second regenerator, and through the third regenerator relative to the fourth regenerator, to be passed into the reforming and oxidant-heating regenerators, is increased. An opposite example is found in the use of low purity oxidant. If the oxygen purity of the oxidant used in the method of the invention is for example 80 vol. % and all of this oxidant is preheated in the regenerators, then the flow rate of the oxidant is 25% more than the case with pure oxygen as oxidant. In this case the flow rate of flue gas into the oxidant-preheating regenerators should be increased by about 30 to 35% and the flow rate of flue gas into the reforming regenerator should be decreased by that amount. Thus, the optimum ratio of the molar flow rates of flue gas from the furnace through the first regenerator relative to that of the second regenerator, and the optimum ratio of the molar flow rates through the third regenerator relative to that of the fourth regenerator, for passing into the reforming regenerator and into the oxidant-heating regenerators, is reduced.

These examples show that the optimum flow ratio of flue gas molar flow rates from the furnace into the reforming regenerator and into the oxidant-heating regenerators may vary considerably depending on the amount and compositions of the fuel, of the recycled gaseous combustion products (RFG), and of the oxidant available for preheating/reforming in the regenerators. Thus the practical and preferred method in this invention is to establish the desired ratio of the flow rates by measuring the temperatures of the flue gas exiting the respective regenerators (or measuring the temperatures at the exit of the regenerators, which corresponds to the temperatures of the gas streams themselves), and adjusting the flow rates of the streams entering the first and second regenerators (in one cycle) and of the streams entering the third and fourth regenerators (in the other cycle) until the two temperatures are within about 300 F, preferably within 200 F, and more preferably within 100 F.

What is claimed is:

1. A method of carrying out combustion in a furnace, comprising
   (A) combusting fuel in a furnace to produce gaseous combustion products, and
   (B) alternately (1) (i) passing a first amount of gaseous combustion products from the furnace into and through a cooled first regenerator that has been cooled in step (B)(2)(iv) to heat said first regenerator and cool said first amount of gaseous combustion products that is passed into said first regenerator,
   (ii) passing a second amount of gaseous combustion products from the furnace into and through a cooled second regenerator that has been cooled in step (B)(2)

(v) to heat said second regenerator and cool said second amount of gaseous combustion products that is passed into said second regenerator, (iii) passing reforming fuel with cooled gaseous combustion products that have been cooled in said first regenerator, with cooled gaseous combustion products that have been cooled in said second regenerator, or with cooled gaseous combustion products that have been cooled in said first regenerator and with cooled gaseous combustion products that have been cooled in said second regenerator, into a heated third regenerator that has been heated in step (B)(2)(i), (iv) reacting the gaseous combustion products and the reforming fuel that have been passed into said third regenerator in step (B)(1)(iii) in said third regenerator in an endothermic reaction under conditions effective to form syngas comprising hydrogen and carbon monoxide, and thereby cooling said third regenerator, (v) passing gaseous oxidant into and through a heated fourth regenerator that has been heated in step (B)(2)(ii) to heat the gaseous oxidant that is passed into said heated fourth regenerator and cool said fourth regenerator, and (vi) passing said syngas that is formed in step (B)(1)(iv) from said third regenerator into said furnace, passing said heated gaseous oxidant that is heated in step (B)(1)(v) from said fourth regenerator into the furnace, and combusting said syngas and said heated gaseous oxidant in the furnace;

while maintaining the ratio of the molar flow rate of said cooled first amount of gaseous combustion products which is passed from said first regenerator to the molar flow rate of said cooled second amount of gaseous combustion products which is passed from said second regenerator at from 45:55 to 65:35; and (2) (i) passing an amount of gaseous combustion products from the furnace into and through a cooled third regenerator that has been cooled in step (B)(1)(iv) to heat said third regenerator and cool said amount of gaseous combustion products that is passed into said third regenerator, (ii) passing an amount of gaseous combustion products from the furnace into and through a cooled fourth regenerator that has been cooled in step (B)(1)(v) to heat said fourth regenerator and cool said amount of gaseous combustion products that is passed into said fourth regenerator, (iii) passing reforming fuel with cooled gaseous combustion products that have been cooled in said third regenerator, with cooled gaseous combustion products that have been cooled in said fourth regenerator, or with cooled gaseous combustion products that have been cooled in said first regenerator and with cooled gaseous combustion products that have been cooled in said fourth regenerator, into a heated first regenerator that has been heated in step (B)(1)(i), (iv) reacting the gaseous combustion products and the reforming fuel that have been passed into the first regenerator in step (B)(2)(iii) in said first regenerator in an endothermic reaction under conditions effective to form syngas comprising hydrogen and carbon monoxide, and thereby cooling said first regenerator, (v) passing gaseous oxidant into and through a heated second regenerator that has been heated in step (B)(1)(ii) to heat the gaseous oxidant that is passed into said heated second regenerator and cool said second regenerator, and (vi) passing said syngas that is formed in step (B)(2)(iv) from said first regenerator into said furnace, passing said heated gaseous oxidant that is heated in step (B)(2)(v) from second regenerator into the furnace, and combusting said syngas and said heated gaseous oxidant in the furnace;

while maintaining the ratio of the molar flow rate of said cooled amount of gaseous combustion products which is passed from said third regenerator to the molar flow rate of said cooled amount of gaseous combustion products which is passed from said fourth regenerator at from 45:55 to 65:35.

2. A method of carrying out combustion in a furnace, comprising (A) combusting fuel in a furnace to produce gaseous combustion products, and (B) alternately (1) (i) passing a first amount of gaseous combustion products from the furnace into and through a cooled first regenerator that has been cooled in step (B)(2)(iii) to heat said first regenerator and cool said first amount of gaseous combustion products that is passed into said first regenerator, (ii) passing a second amount of gaseous combustion products from the furnace into and through a cooled second regenerator that has been cooled in step (B)(2)(iv) to heat said second regenerator and cool said second amount of gaseous combustion products that is passed into said second regenerator, (iii) passing reforming fuel into and through a heated third regenerator that has been heated in step (B)(2)(i) to heat the reforming fuel and cool said third regenerator, (iv) passing gaseous oxidant into and through a heated fourth regenerator that has been heated in step (B)(2)(ii) to heat said gaseous oxidant and cool said fourth regenerator, and (v) passing said heated reforming fuel that has been heated in step (B)(1)(iii) from said third regenerator into said furnace, passing said heated gaseous oxidant that has been heated in step (B)(1)(iv) from the fourth regenerator into the furnace, and combusting said heated reforming fuel and said heated gaseous oxidant in the furnace;

while maintaining the ratio of the molar flow rate of said first amount of cooled gaseous combustion products which is passed from said first regenerator to the molar flow rate of said cooled second amount of gaseous combustion products which is passed from said second regenerator at less than 65:35 and greater than 45:55; and (2) (i) passing an amount of gaseous combustion products from the furnace into and through a cooled third regenerator that has been cooled in step (B)(1)(iii) to heat said third regenerator and cool said amount of gaseous combustion products that is passed into said third regenerator, (ii) passing an amount of gaseous combustion products from the furnace into and through a cooled fourth regenerator that has been cooled in step (B)(1)(iv) to heat said fourth regenerator and cool said amount of gaseous combustion products that is passed into said fourth regenerator, (iii) passing reforming fuel into a heated first regenerator that has been heated in step (B)(1)(i) to heat the reforming fuel and cool said first regenerator, (iv) passing gaseous oxidant into and through a heated second regenerator that has been heated in step (B)(1)(ii) to heat said gaseous oxidant and cool said second regenerator, and (v) passing said heated reforming fuel that has been heated in step (B)(2)(iii) from said first regenerator into said furnace, passing said heated gaseous oxidant that has been heated in step (B)(2)(iv) from second regenerator into the furnace, and combusting said heated reforming fuel and said heated gaseous oxidant in the furnace;

while maintaining the ratio of the molar flow rate of said amount of cooled gaseous combustion products which is passed from said first regenerator to the molar flow rate of said cooled second amount of gaseous combustion products which is passed from said second regenerator at less than 65:35 and greater than 45:55.

3. The method of claim 1 wherein the molar ratio of cooled gaseous combustion products to reforming fuel in one or both of steps (B)(1)(iii) and (B)(2)(iii) is between 0.5 and 1.5 and said ratio of the molar flow rate of said cooled amount of gaseous combustion products which is passed from said first regenerator to the molar flow rate of said cooled second amount of gaseous combustion products which is passed from said second regenerator is from 55:45 to 65:35.

4. The method of claim 1 wherein the molar ratio of cooled gaseous combustion products to reforming fuel in one or both of steps (B)(1)(iii) and (B)(2)(iii) is up to 0.5 and said ratio of the molar flow rate of said cooled first amount of gaseous combustion products which is passed from said first regenerator to the molar flow rate of said cooled second amount of gaseous combustion products which is passed from said second regenerator is from 50:50 to 60:40.

5. The method of claim 1 wherein at the end of steps (B)(1)(iii) and (B)(1)(v) the flows of said reforming fuel to said third regenerator and of said oxidant to said fourth regenerator are terminated and gaseous combustion products from the furnace are flowed through said third and fourth regenerators so that syngas in the third regenerator and oxidant in the fourth regenerator are expelled to the furnace and combusted to completion, and wherein at the end of steps (B)(2)(iii) and (B)(2)(v) the flows of said reforming fuel to said first regenerator and of said oxidant to said second regenerator are terminated and gaseous combustion products from the furnace are flowed through said first and second regenerators so that syngas in the first regenerator and oxidant in the second regenerator are expelled to the furnace and combusted to completion.

6. The method of claim 2 wherein at the end of steps (B)(1)(iii) and (B)(1)(iv) the flows of said reforming fuel to said third regenerator and of said oxidant to said fourth regenerator are terminated and gaseous combustion products from the furnace are flowed through said third and fourth regenerators so that syngas in the third regenerator and oxidant in the fourth regenerator are expelled to the furnace and combusted to completion, and wherein at the end of steps (B)(2)(iii) and (B)(2)(iv) the flows of said reforming fuel to said first regenerator and of said oxidant to said second regenerator are terminated and gaseous combustion products from the furnace are flowed through said first and second regenerators so that syngas in the first regenerator and oxidant in the second regenerator are expelled to the furnace and combusted to completion.

7. The method of claim 2 wherein at the end of step (B)(1)(iii) the flow of said reforming fuel to said third regenerator is terminated and gaseous combustion products from said furnace are flowed through said third regenerator into the furnace to reduce the amount of soot present in the third regenerator, and wherein at the end of step (B)(2)(iii) the flow of said reforming fuel to said first regenerator is terminated and gaseous combustion products from said furnace are flowed through said first regenerator into the furnace to reduce the amount of soot present in first regenerator.

8. The method of claim 1 wherein at the end of step (B)(1)(iii) the flow of said reforming fuel to said third regenerator is terminated while letting the flow of gaseous combustion products continue to flow through third regenerator to reduce the amount of soot present therein, and wherein at the end of step (B)(2)(iii) the flow of said reforming fuel to said first regenerator is terminated while letting the flow of gaseous combustion products continue to flow through the first regenerator to reduce the amount of soot present therein.

9. The method of claim 1 wherein said reforming fuel is natural gas.

10. The method of claim 2 wherein said reforming fuel is natural gas.

11. The method of claim 1 wherein said gaseous oxidant contains 80 to 100 vol. % O2.

12. The method of claim 2 wherein said gaseous oxidant contains 80 to 100 vol. % O2.

* * * * *